United States Patent [19]

Stallmo et al.

[11] Patent Number: 5,546,535
[45] Date of Patent: Aug. 13, 1996

[54] MULTIPLE CONTROLLER SHARING IN A REDUNDANT STORAGE ARRAY

[75] Inventors: David C. Stallmo; Anthony Andrews; Candace Brinkman, all of Boulder, Colo.

[73] Assignee: EMC Corporation, Hopkinton, Mass.

[21] Appl. No.: 372,874

[22] Filed: Jan. 13, 1995

Related U.S. Application Data

[63] Continuation of Ser. No. 852,374, Mar. 13, 1992, abandoned.

[51] Int. Cl.$^6$ .................................................. G11C 29/00
[52] U.S. Cl. ............................. 395/182.07; 395/183.18
[58] Field of Search ................................. 371/10.1, 8.1, 371/7, 11.1; 395/575, 425, 182.07, 183.18, 183.16, 183.01, 182.02; 364/246.3, 264.6, 268

[56] References Cited

U.S. PATENT DOCUMENTS

| | | |
|---|---|---|
| 3,893,178 | 7/1975 | Sordello . |
| 4,007,448 | 2/1977 | Sergeant et al. ............ 340/172.5 |
| 4,092,732 | 5/1978 | Ouchi . |
| 4,443,849 | 4/1984 | Ohwada .................... 364/200 |
| 4,467,421 | 8/1984 | White . |
| 4,468,731 | 8/1984 | Johnson et al. ............ 364/200 |
| 4,562,576 | 12/1985 | Ratcliffe . |
| 4,667,326 | 5/1987 | Young et al. . |
| 4,722,085 | 1/1988 | Flora et al. . |
| 4,754,397 | 6/1988 | Varaiya et al. . |
| 4,761,785 | 8/1988 | Clark et al. . |
| 4,768,193 | 8/1988 | Takemae . |
| 4,775,978 | 10/1988 | Hartness . |
| 4,817,035 | 3/1989 | Timsit . |
| 4,817,091 | 3/1989 | Katzman ................... 371/9 |
| 4,849,929 | 3/1989 | Timsit . |
| 4,862,411 | 8/1989 | Dishon et al. .............. 364/952 |
| 4,870,643 | 9/1989 | Bultman et al. . |
| 4,899,342 | 2/1990 | Potter et al. . |
| 4,914,656 | 4/1990 | Dunphy, Jr. et al. . |
| 4,933,030 | 2/1991 | Krakauer et al. . |
| 4,989,206 | 1/1991 | Dunphy, Jr. et al. . |
| 5,088,081 | 2/1992 | Farr . |
| 5,130,992 | 7/1992 | Frey, Jr. et al. . |
| 5,134,619 | 7/1992 | Hensen et al. . |
| 5,155,845 | 10/1992 | Beal et al. ................. 395/575 |
| 5,214,652 | 5/1993 | Sutton ....................... 371/9.1 |
| 5,274,645 | 12/1993 | Idleman et al. ............. 371/10.1 |
| 5,274,789 | 12/1993 | Costa et al. ................ 395/425 |

FOREIGN PATENT DOCUMENTS

| | | |
|---|---|---|
| 0434532A1 | 6/1991 | European Pat. Off. . |
| WO9113399 | 9/1991 | WIPO . |
| WO9113405 | 9/1991 | WIPO . |
| WO9117506 | 11/1991 | WIPO . |

OTHER PUBLICATIONS

Bhide et al., A Highly Available Network File Server, Winter 91, pp. 199–201.

(List continued on next page.)

*Primary Examiner*—Robert W. Beausoliel, Jr.
*Assistant Examiner*—Norman M. Wright
*Attorney, Agent, or Firm*—John Land, Esq.

[57] ABSTRACT

A redundant array storage system including storage units divided into two logical arrays. The redundant array storage system further includes a plurality of array control units which are all fully utilized to control data transfers between the logical arrays and a central processing unit, each controller being capable of taking over the task of a failed controller. In normal operation, each redundant array controller may only access data stored in a logical array assigned to that controller. If the other redundant array controller fails, the remaining controller may access the data stored in the logical array assigned to the failed controller only through a secondary control process that is independent from the primary control process of the remaining controller. Thus, the invention prevents parity data associated with user data placed in storage from being corrupted by attempts of two or more array control units to access the same redundancy group of data concurrently.

14 Claims, 8 Drawing Sheets

OTHER PUBLICATIONS

Gray, et al., Tandem Computers, Inc., 19333 Vallco Parkway Cupertino, CA 95014 –Parity Striping of Disc Arrays: Low–Cost Reliable Storage With Acceptable Throughput.

Computer Technology Review, Mar. 1989, No. 3, Los Angeles, CA U.S. –OLTP Systems Need to be Fault Tolerant.

Patterson, D. A., Gibson, G., and Katz, H.; A Case For Redundant Arrays of Inexpensive Disks (RAID).

Lee, E. K.; Software and Performance Issues in the Implementation of a RAID Prototype (May 1990).

Chen, P., Gibson, G., Katz, R. H., Patterson, D. A., and Schulze, M.; Introduction to Redundant Arrays of Inexpensive Disks (RAID (Dec. 1988).

Chen, P., Gibson, G., Katz, R. H., Patterson, D. A., and Schulze, M., et al. Evolution of the Raid 2 Architecture (Jun. 12, 1990).

Maximum Strategy, Inc., San Jose, CA; Strategy 2 Disk Array Controller Operation Manual (Nov. 2, 1988).

Maximum Strategy, Inc., San Jose, CA; Strategy 1 Disk Array Controller Operation Manual (Date unknown).

Gibson, G. A., Performance and Reliability in Redundant Arrays of Inexpensive Disks (Date Unknown).

Chen, P., An Evaluation of Redundant Arrays of Disks Using an Amdahl 5890; (May 1989).

Katz, R. H., Gibson, G. A., and Patterson, D. A.,; Disk System Architectures for High Performance Computing (Mar. 1989).

Gray, J., Horst, B., and Walker, M.; Parity Striping of Disc Arrays: Low–Cost Reliable Storage with Acceptable Throughtput (Jan. 1990).

Schultz, M. E.; Considerations in the Design of a Raid Prototype (Aug. 1988).

Clark, and Corrigan; IBM Systems Journal, vol. 23, No. 3, 1989.

MULTIPLE CONTROLLER SHARING IN A REDUNDANT STORAGE ARRAY

This is a continuation of application Ser. No. 07/852,374 filed on Mar. 13, 1992, now abandoned.

BACKGROUND OF THE INVENTION

1. Field of the Invention

This invention relates to a computer data storage system, and more particularly to a redundant data storage array system in which a plurality of storage units are divided into logical arrays such that redundant array controllers may concurrently access stored data.

2. Description of Related Art

A typical data processing system generally includes one or more storage units which are connected to a Central Processing Unit (CPU) either directly or through a control unit and a channel. The function of the storage units is to store data and programs which the CPU uses in performing particular data processing tasks.

Various types of storage units are used in current data processing systems. A typical system may include one or more large capacity tape units and/or disk drives (magnetic, optical, or semiconductor) connected to the system through respective control units for storing data. A research group at the University of California, Berkeley, in a paper entitled "A Case for Redundant Arrays of Inexpensive Disks (RAID)", Patterson, et al., Proc. ACM SIGMOD, June 1988, has catalogued a number of different approaches for providing such reliability when using disk drives as failure independent storage units. Arrays of disk drives are characterized in one of five architectures, under the acronym "RAID" (for Redundant Arrays of Inexpensive Disks).

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Corporation.

A RAID 2 architecture stores each bit of each word of data, plus Error Detection and Correction (EDC) bits for each word, on separate disk drives. For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is Written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for On-Line Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed onto a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 1804 SCSI, that uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

A limitation of a RAID 4 system is that Writing a data block on any of the independently operating storage units also requires writing a new parity block on the parity unit. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" (RMW) operation.

Thus, a Read and a Write on the single parity unit occurs each time a record is changed on any of the storage units covered by a parity record on the parity unit. The parity unit becomes a bottle-neck to data writing operations since the number of changes to records which can be made per unit of time is a function of the access rate of the parity unit, as opposed to the faster access rate provided by parallel operation of the multiple storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage device containing parity for the N data blocks of the stripe. Further stripes each have a parity block, the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be Written to the fifth drive; the parity information for the second stripe of blocks may be Written to the fourth drive; the parity information for the third stripe of blocks may be Written to the third drive; etc. The parity block for succeeding stripes typically "processes" around the disk drives in a helical pattern (although other patterns may be used).

In systems such as the RAID systems described above, in which an array of storage units is controlled by an array control unit (controller), a problem exists if the controller fails, thereby making information contained in the storage units coupled to that controller unavailable to the system. Often, such a failure will shut down the entire computer system.

The prior art has suggested ways to solve the problem of reliably storing and retrieving data despite the possibility that an array controller may fail. FIG. 1 illustrates one way suggested in the prior art to resolve this problem. In the system shown in FIG. 1, redundant controllers 3, 4 are provided, such that each storage unit 40–51, arranged in two redundancy groups is coupled to a CPU 1 through the controllers 3, 4. Each controller 3, 4 is coupled to each storage unit 40–51 by a multiplicity of channels 5. Each of the channels 5 is a multi-user bus, such as a Small Computer System Interface (SCSI) bus. While twelve storage units 40–51 are shown for illustrative purposes, the broken lines between the storage units 40–51 indicate that a multiplicity of other storage units may be present in the invention. A single one of the data channels 5 couples each of the storage units in a single column (for example, 40 and 46; 41 and 47; 42 and 48, etc.) to each other and to the two controllers 3, 4.

In such systems, one controller 3 is considered to be the primary controller and the other to be a secondary controller 4. The primary controller 3 is responsible for the task of interfacing storage units 40–51 to the CPU 1. Only when there is a failure of the primary controller 3 does the secondary controller 4 become active. If the primary controller 3 fails, the secondary controller 4 assumes the full responsibility for interfacing the storage units 40–51 to the CPU 1.

FIG. 2 shows how the data storage area is allocated in a typical storage unit used in such prior art data storage systems. A diagnostics section 11 comprising one or more data blocks at each end of the addressable storage space is allocated for the purpose of determining whether the storage unit is functional. Diagnostic codes may be written into this area and subsequently read back. Following the diagnostic section 11 is a section 12 known in the art as a "reserved area" which is used to store such information as system configuration data, further diagnostics data, scratch pad, primary software, and secondary software. Following the reserved area, and comprising the majority of the data storage area of the storage unit, is the user area 14. The user area 14 comprises those blocks of data available to the system user and the system tasks.

Two problems exist in the system shown in FIG. 1. Firstly, the secondary controller 4 is not utilized under normal conditions. Therefore, the potential of the system is greater than its normal capability. Such a waste of resources is costly and inefficient.

Secondly, if the primary controller 3 fails, the secondary controller 4 may not be capable of determining that a failure has occurred and what steps must be taken to continue any operations which were in progress at the time of the failure.

One factor which limits the ability of the system to take full advantage of the secondary controller's 4 potential is the concern over "collisions" between the controllers 3, 4. A collision occurs when more than one controller attempts to write data blocks within the same redundancy group in a RAID system. When data is to be written to a storage unit of a RAID system, a RMW operation must be performed.

It is possible for redundant controllers to each begin modifying data blocks within the same redundancy group, thereby causing the redundancy group to maintain an inaccurate parity block. To illustrate this refer to FIG. 3(a)–3(c). FIG. 3(a) illustrates the values of data blocks 101–105 of a single redundancy group in a system in which five storage units 200–204 comprise a redundancy group. An array controller 106 is the primary controller and a second array controller 107 is a redundant controller. Stored in data block 101 of storage unit 200 is the value "1001." Data block 102 of storage unit 201 has the value "1110." The value "0010" is stored in data block 103 of storage unit 202. The value "1010" is stored in data block 104 of storage unit 203. A parity storage unit 204 has the value stored in data block 105, comprising the exclusive-OR sum ("1111") of the data blocks 101–104 stored in the other storage units 200–203.

If the primary array controller 106 begins a RMW operation to data block 101 of storage unit 200, the controller 106 will accept into an "old data" register 108 the value of the data block that is to be modified. Therefore, the value "1001" will be read and stored in register 108. The value of data block 105 of the parity storage unit 204 will be read and stored in an "old parity" data register 109 of the primary array controller 106. The next step in the RMW sequence is to calculate the exclusive-OR (XOR) sum of the old data and the old parity values. The XOR sum ("0110") is stored as a partial-parity value in a result register 116 in the primary array controller 106. The value of the result register 116 is then XOR summed with the value of the new data in a "new data" register 110 of the primary array controller 106. The resulting final parity value ("1100") is stored in a "new parity" register 111.

If the redundant array controller 107 were to attempt to perform a second RMW to a different data block 102 within the same redundancy group during the time the primary array controller 106 was calculating a new parity value for data block 1 01, a read of the old data block 102 and the old parity block 105 would be performed and the values of the old data block 102 and the old parity block 105 would be stored in corresponding old data and old parity registers 112, 113 in the redundant array controller 107.

The same operations that were performed in the primary controller 106 would be performed in the redundant array controller 107 and the new data and new parity values would be stored in corresponding new data register, and new parity registers 114, 115 of the redundant array controller 107. It is then possible that during the time that the new parity value is being calculated in the redundant array controller 107, the primary array controller 106 will update data block 101 of storage unit 200 and parity block 105 of parity storage unit 204, as shown in FIG. 3b.

In FIG. 3c, the values of the new data and new parity calculated in the redundant array controller 107 are stored in data block 102 of storage unit 201 and data block 105 of the parity storage unit 204. However, because the redundant array controller 107 read the old parity value from data block 105 of the parity storage unit 204 before the change made by the primary array controller 106, the value now stored in data block 105 of the parity storage unit 204 does not take into account the change made to data block 1 01 of storage unit 200. Therefore, the system will not be capable of recovering the data stored if a failure occurs. This is undesirable in a fault tolerant system.

Therefore, it is desirable to provide means which allows two or more array controllers to be simultaneously active without losing the ability to completely recover from a failure of one of the storage units, while maintaining the capability of each controller to take over the tasks of the other controller if a failure occurs. It is also desirable to provide a method by which any controller may be removed from (or brought into) service such that any other controller may begin (or cease) performing the tasks of the controller so removed from (or brought into) service. The present invention provides such means and method.

SUMMARY OF THE INVENTION

The present invention is a redundant array storage system including storage units logically divided into redundant logical arrays. The present invention further includes a plurality of array control units (controllers) fully and continuously utilized to control data transfers between the redundant logical arrays and at least one central processing unit (CPU), and yet capable of taking over the task of a failed controller.

In the preferred embodiment of the invention, the physical storage units are mapped into a plurality of logical storage units. Each logical storage unit is comprised of non-overlapping groups of data blocks. The logical storage units are logically grouped into two logical arrays. Two array controllers correspond one-to-one with the two logical arrays and interface the logical arrays with the CPU. When both controllers are functional, each logical array is under the control of a corresponding controller. If a controller fails, the other controller will assume operational control of both logical arrays.

Since each logical array is controlled by only one array controller, both controllers can be active simultaneously without concern that "collisions" will occur. A collision occurs only if more than one controller attempts to access blocks of data within the same redundancy group.

In the preferred embodiment, each controller sends and receives a variety of messages to each other. In addition, each controller maintains a timer associated with the other controller. Whenever a message is received by one controller from the other controller, the receiving controller's timer is reset. If such a message is not received within a specified interval, the receiving controller will either take over control of both logical arrays, or transmit a message to the CPU indicating that the delinquent controller has failed. The decision as to which of these actions will be taken is user controllable.

Further aspects of the present invention will become apparent from the following detailed description when considered in conjunction with the accompanying drawings. It should be understood, however, that the detailed description and the specific examples, while representing the preferred embodiment of the invention, are given by way of illustration only.

BRIEF DESCRIPTION OF THE DRAWINGS

Like reference numbers and designations in the drawings refer to like elements.

DETAILED DESCRIPTION OF THE INVENTION

Throughout this description, the preferred embodiment and examples shown should be considered as exemplars, rather than limitations on the present invention.

Physical Configuration

Figure 1:
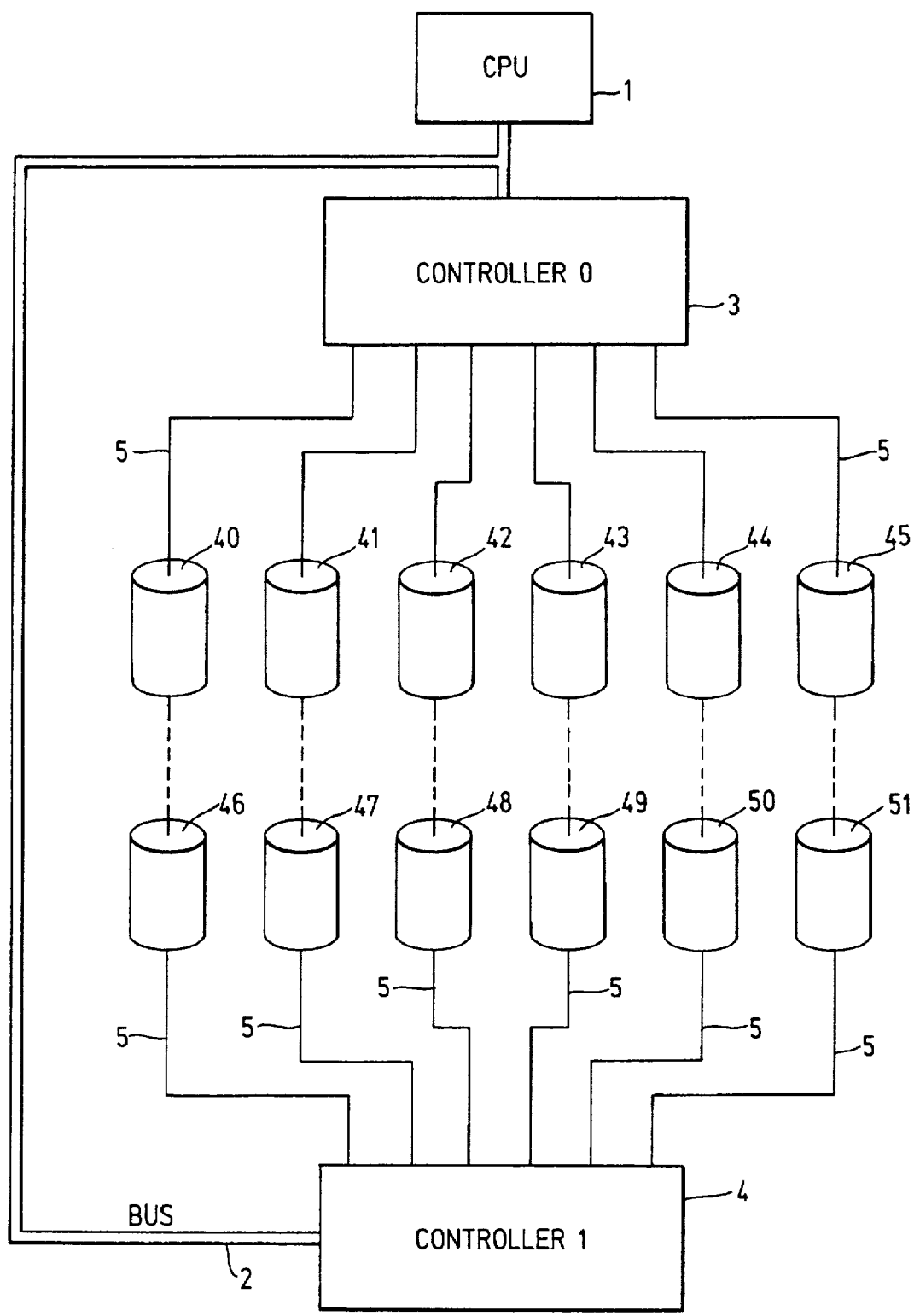
FIG. 1 is block diagram of a prior art failure-independent system in which an array of redundant storage units is interfaced to a central processing unit by multiple redundant array controllers as a means to reliably store data.
Figure 2:
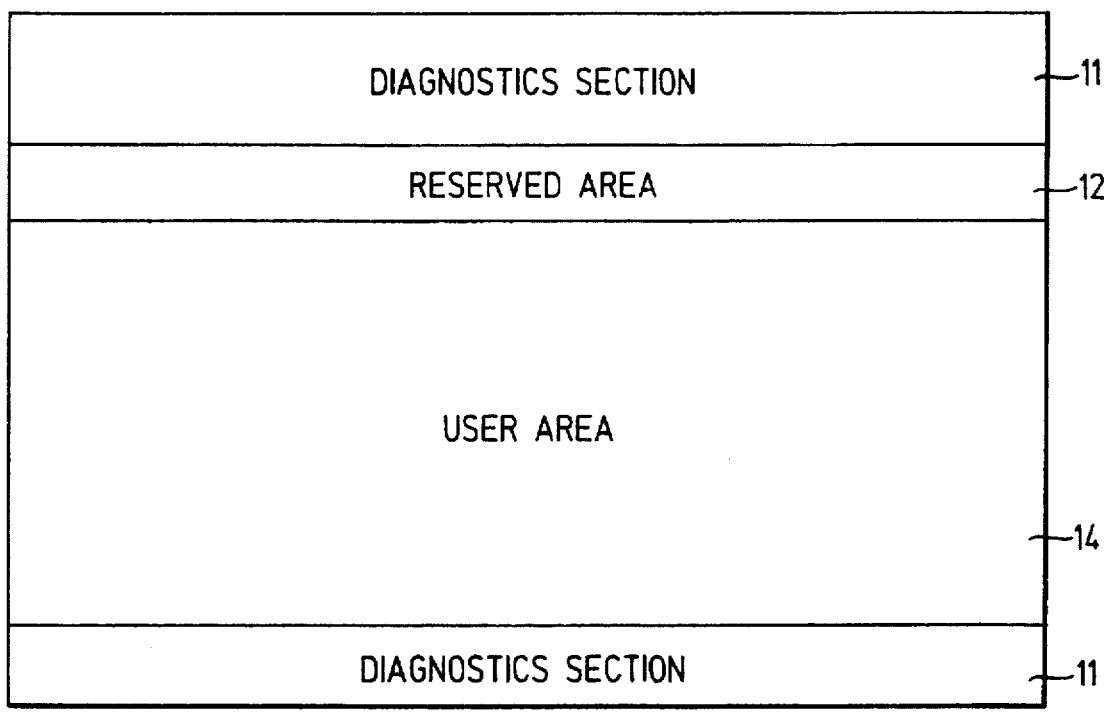
FIG. 2 is a schematic representation of the allocation of data blocks within a storage unit used in a prior art failure-independent data storage system.
Figure 3A:
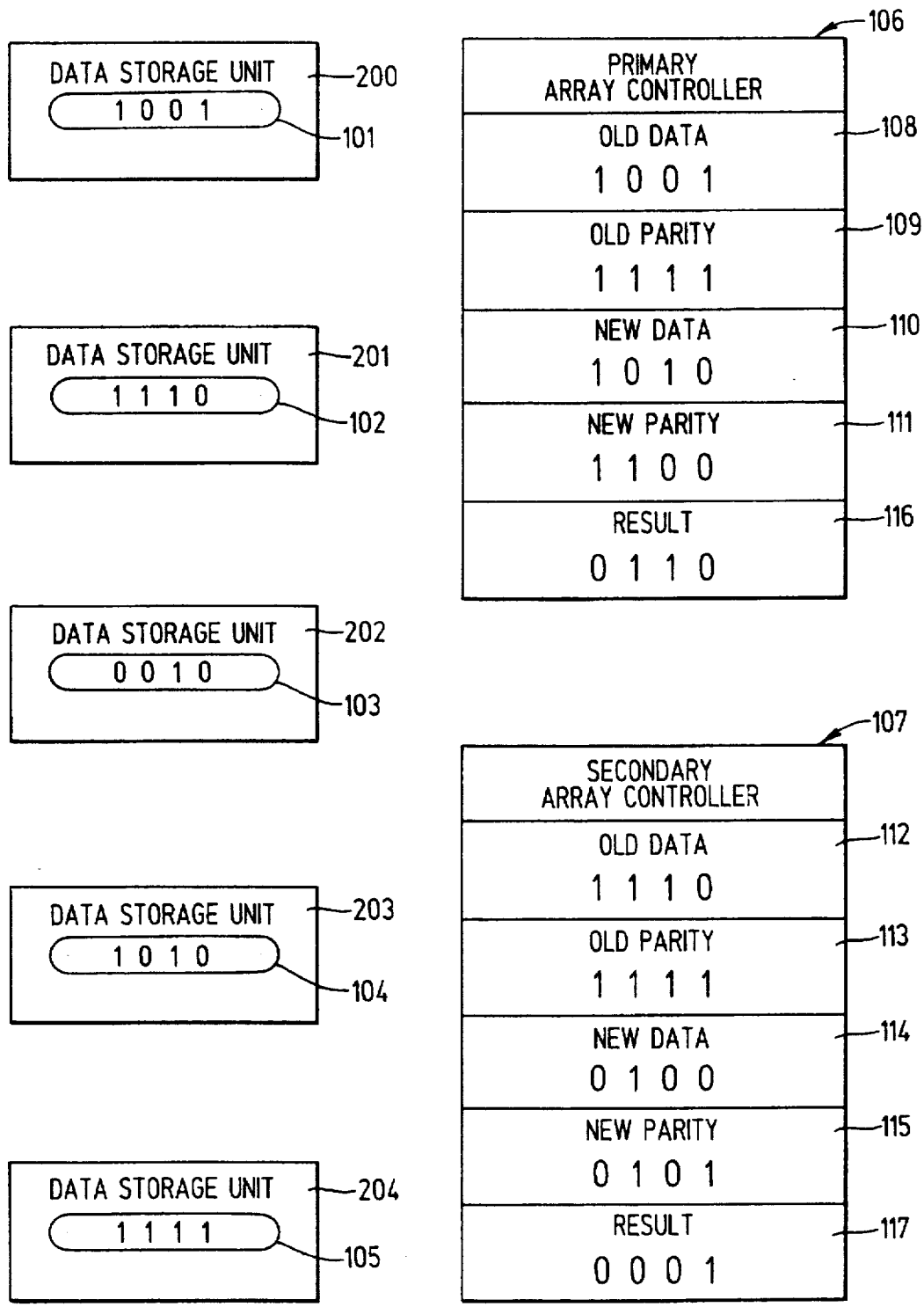
FIG. 3a is an illustration of selected data blocks and data registers of a prior art failure-independent storage system before an update of two of the blocks stored on separate storage units.
Figure 3B:
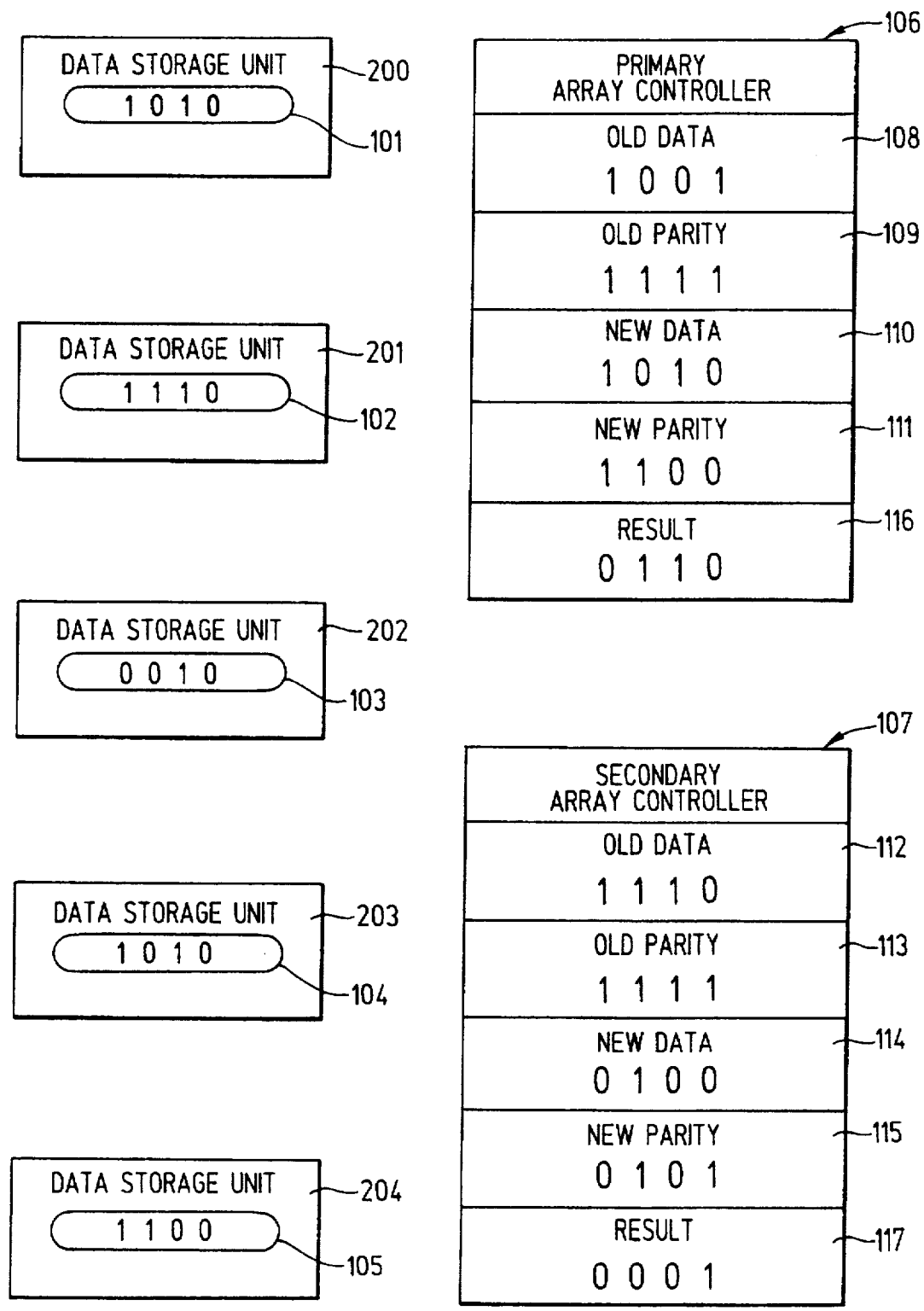
FIG. 3b is an illustration of selected data blocks and data registers of a prior art failure-independent storage system after storing updated data into one of two blocks being updated.
Figure 3C:
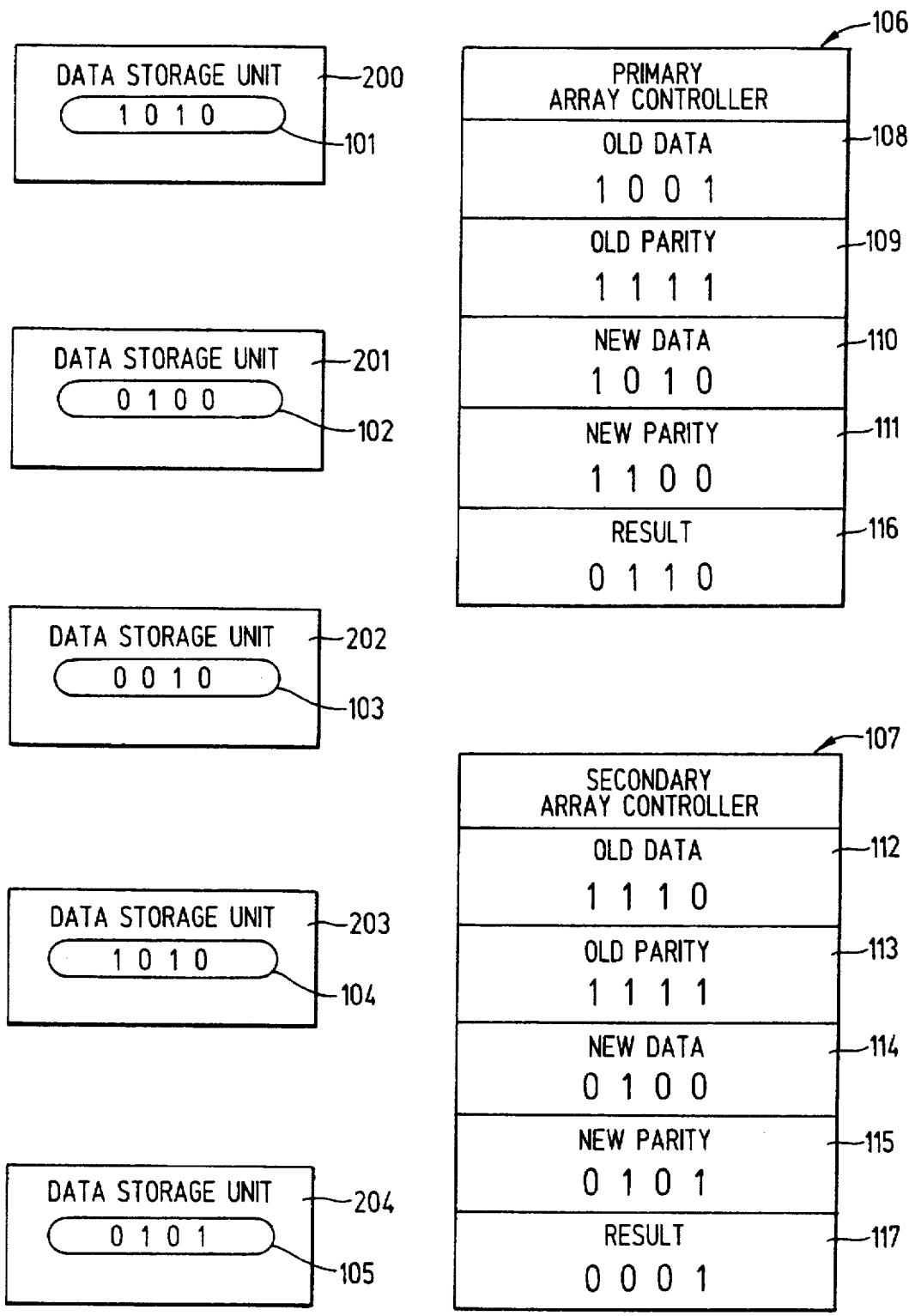
FIG. 3c is an illustration of selected data blocks and data registers of a prior art failure-independent storage system after storing updated data into two blocks being updated concurrently by two array controllers.
Figure 4:
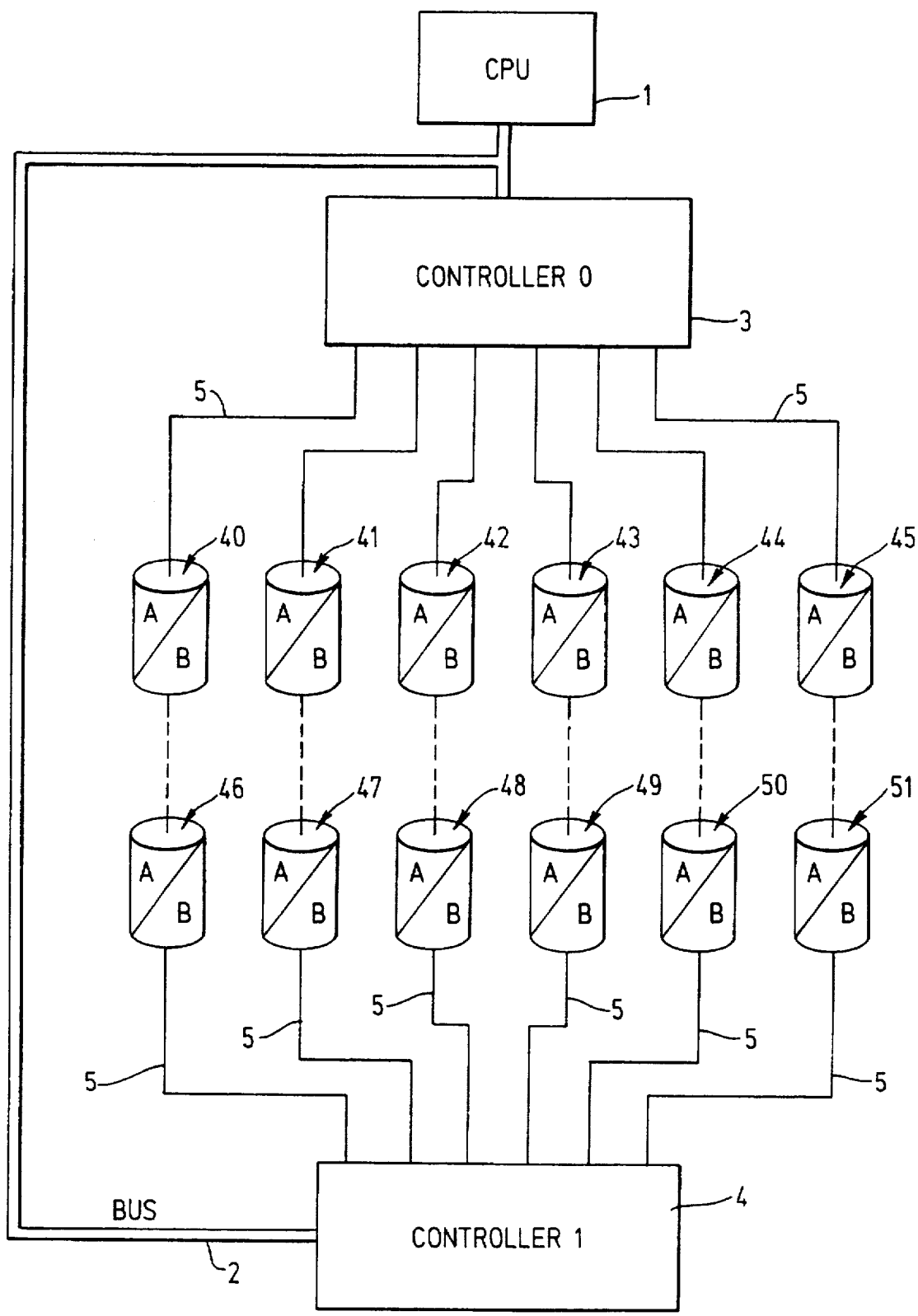
FIG. 4 is a block diagram of the preferred embodiment of the present invention.

FIG. 4 is a simplified block diagram of the preferred embodiment of the present invention. In FIG. 4, a Central Processing Unit (CPU) 1 is coupled to two array control units (controllers) 3, 4 by a bus 2. While only one CPU 1 is used in the preferred embodiment, it is possible to use more than one CPU connected to the Bus 2. Each controller 3, 4 is coupled to the other controller and to a plurality of storage units 40–51 by I/O channels 5 (e.g., SCSI buses). Each I/O channel 5 is capable of supporting a plurality of storage units 40–51. Additional storage units (not shown) may be present and are represented by broken lines extending between the storage units 40–45 and 46–51. Each controller 3, 4 preferably includes a separately programmable, multi-tasking processor (for example, the MIPS R3000 RISC processor, made by MIPS Corporation of Sunnyvale, Calif.) which can act independently of the CPU 1 to control the storage units.

Typical physical storage units which can be used in the present invention, such as magnetic or optical disk drives, comprise a set of one or more rotating disks each having at least one read/write transducer head per surface. In such units, data storage areas known as tracks are concentrically arranged on the disk surfaces. A disk storage unit may have, for example, 500 to 2000 tracks per disk surface. Each track is divided into numbered sectors that are commonly 512 bytes in size (although other sizes may be used). Sectors are the smallest unit of storage area that can be accessed by the storage unit (data bits within a sector may be individually altered, but only by reading an entire sector, modifying selected bits, and writing the entire sector back into place). A disk storage unit may have 8 to 50 sectors per track, and groups of tracks may differ in the numbers of sectors per track on the same disk storage unit (e.g., smaller circumference inner tracks may have fewer sectors per track, while larger circumference outer tracks may have more sectors per track).

Access to a sector ultimately requires identification of a sector by its axial displacement along a set of rotating disks, radial displacement on a disk, and circumferential displacement around a disk. Two common schemes are used for such identification. One scheme identifies a sector by a surface or head number (axial displacement), a track number (radial displacement), and a sector number (circumferential displacement). The second scheme treats all of the tracks with the same radius on all disks as a "cylinder", with tracks being subsets of a cylinder rather than of a surface. In this scheme, a sector is identified by a cylinder number (radial displacement), a track number (axial displacement), and a sector number (circumferential displacement).

It is possible for a higher level storage controller (or even the CPU) to keep track of the location of data on a storage unit by tracking all involved sectors. This is commonly done with magnetic disk drives following the well-known ST-506 interface standard used in personal computers. Storage units addressed in this manner are known as sector-addressable.

However, it is inconvenient in modern computer systems for a high-level storage controller to keep track of sector addresses by either of the addressing schemes described above. Therefore, as is known in the art, the preferred embodiment of the invention uses an alternative form of storage unit addressing that maps the sectors of a storage unit to a more tractable form.

Logical Configuration

Mapping in the preferred embodiment of the present invention is accomplished by treating one or more sectors as a block and addressing each storage unit by block numbers. A block on the storage units used in the preferred embodiment of the inventive system can vary from 512 bytes up to 4096 bytes, but may be of any size. The storage units being used must support the specified block size. Such units are known as block-addressable.

For example, with storage units having a Small Computer System Interface ("SCSI"), each storage unit is considered to be a contiguous set of blocks. An access request to such a unit simply specifies identification numbers of those blocks that are to be accessed. Alternatively, the access request specifies the identification number of a starting block and the quantity of subsequent logically contiguous blocks to be accessed. Thereafter, when using disk drives as storage units, the SCSI controller for the unit translates each block number either to a cylinder, track, and sector number format, or to a head, track, and sector number format. This translation is transparent to the requesting device.

It should be understood that the inventive concept can be applied to sector-addressable storage units. However, the preferred embodiment of the invention uses block-addressable storage units.

The present invention creates a logical structure to map a plurality of block-addressable storage units, thereby defining a basic storage unit array architecture. The basic storage unit array architecture formed by the logical structuring the present invention establishes logical storage units, comprising a plurality of non-overlapping groups of data blocks on physical storage units (although a logical storage unit cannot span multiple, physical storage units). In the present invention, the logical storage units are then assigned to logical volumes. An example of such assignment is set forth in the copending application entitled "Logical Partitioning of a Redundant Array", Ser. No. 07/61 2,220, assigned to the Assignee of the present invention. The teachings of the Stallmo application are hereby incorporated by reference. In the present invention, the logical volumes are then assigned to one of two logical arrays.

By way of example, 12 physical storage units are shown in FIG. 4, each divided into at least two logical storage units, A and B. The logical storage units A, B, may be assigned to one or more logical volumes, as desired. Importantly, the separate groups of logical storage units A, B, are assigned to corresponding "logical arrays", A0 and A1. In the preferred embodiment, each controller 3, 4, is assigned primary responsibility for the transfer of data into and out of one, and only one, of the two logical arrays A0 and A1 and may not access the other logical array unless the controller assigned to that logical array has failed. When a controller fails, the data stored in the logical storage units assigned to the failed controller will be available to the CPU1 after control of the logical array assigned to the failed controller is assumed by the remaining controller.

In an alternative embodiment, more than one CPU is present. Each CPU is assigned to a discrete controller and logical array. Each CPU may access only that controller and logical array which is assigned that CPU, in order to prevent multiple CPUs from accessing the same redundant group.

Creation of Logical Arrays

Figure 5:
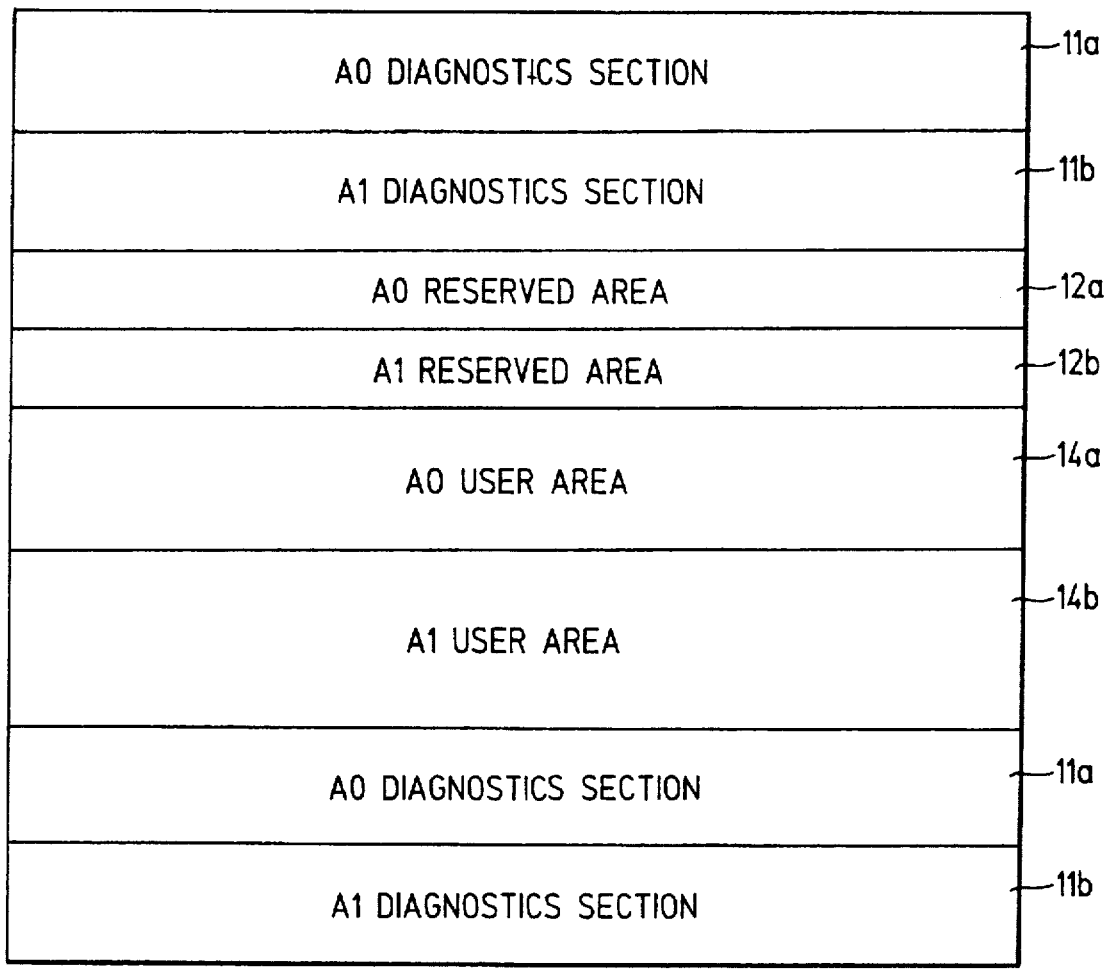
FIG. 5 is a schematic representation of the allocation of the data blocks within a storage unit used in the present invention.

FIG. 5 is a diagram of the data storage allocation with a typical logical storage unit of the preferred embodiment of the present invention. At the top (lower order addresses) of the addressable data storage area available within the storage unit are diagnostic sections 11A, 11B, each corresponding to a logical array A0 or A1, and used for diagnostic testing. Following are reserved areas 12a, 12b, each containing configuration structures, error logs, software load areas, host scratch pads and diagnostic test areas, and each corresponding to a logical array A0 or A1. A user area 14 follows the two reserved areas 12a, 12b and is several orders of magnitude larger than the other sections of the addressable space. The user area 14 is flexibly divided by the user into distinct subsections 14a, 14b, each corresponding to a logical array A0 or A1. The user area subsections 14a, 14b need not be of equal sizes. Because only two logical arrays are present in the preferred embodiment, the user area 14, as well as the diagnostic sections 11 and reserved area 12 are each shown as divided into two subsections. However, it should be noted that the user area 14, the diagnostic area 11, and the reserved area 12 may be divided into as many distinct subsections as there are logical arrays. Corresponding subsections (a or b) of the user area 14, diagnostic section 11, and the reserved area 12 comprise a logical storage unit (LSU). A description of the logical configuration of the storage unit array is sent to the controllers 3, 4, by the CPU 1. The logical configuration indicates which LSUs are in each redundancy group, which redundancy groups make up each logical volume, and which logical volumes are in each logical array. The user is responsible for insuring that the logical configurations sent to each controller 3, 4, are identical and that the blocks of data assigned to each logical array A0, A1 do not overlap. Each controller 3, 4, is responsible for insuring that each logical array A0, A1 assigned is valid. For a logical array to be valid, no LSU may be assigned to any other logical array. Furthermore, each redundancy group must consist of LSUs which are assigned to the same logical array. Also, each redundancy group assigned to a logical volume must be assigned to the same logical array. The logical configuration is recorded in a configuration section of the reserved area 12a, 12b of each logical array. In alternative embodiments in which more than one CPU is being used, each CPU will define the logical configuration for the controller(s) that is associated with that CPU.

Upon assigning each LSU to a particular logical array A0, A1, only the controller that is responsible for the logical array associated with an LSU will be granted access to the LSU. For example, in FIG. 4, each physical storage unit 40–51 is divided into two LSUs A, B. Each "A" LSU is assigned to logical array A0. Each "B" LSU is assigned to logical array A1. Therefore, only the controller assigned to logical array A0 is permitted to access the "A" LSUs, and only the controller assigned to logical array A1 is permitted to access the "B" LSUs. CPU commands to a logical array A0, A1 must be sent to the controller 3, 4, assigned to that logical array. For example, a "logical array" field in each command may be set to indicate the logical array of interest. Commands for a logical array that are sent to a controller not assigned to that logical array will cause an error message to be returned to the CPU.

By creating two sets of LSUs, each set comprising a logical array, and limiting the access of each of the controllers 3, 4, to the logical array exclusively assigned to that controller, it is possible for each controller 3, 4 to access data independently of the other controller without concern that the other controller will access a block of data in the same redundancy group. Spare physical storage units remain unassigned to a logical array until they are required for replacement of a failed physical storage unit. Upon being brought into service, a spare physical storage unit is assigned to the logical array of the physical storage unit which is being replaced.

Operational Aspects of the Invention

In the preferred embodiment of the invention, there are several functions that each controller 3, 4 must be capable of performing. These include: reading data from and storing data into the LSUs of the logical array assigned to the controller; rebuilding data that is stored in a failed storage unit to a spare physical storage unit; installing a new physical storage unit; performing physical storage unit operations (such as synchronizing the spindles of each of the physical storage units, formatting storage units, and performing diagnostic operations); assuming control of the other logical array upon the failure of the other controller; and, starting from an initial application of power, determining which logical array the controller is to control.

Because some of these functions (such as rebuild operations) require that a single controller be primarily responsible, all global functions (i.e., those functions which are common to both logical arrays) are performed by logical array A0. The choice of logical array A0 is arbitrary. Since the function is assigned to logical array A0, the controller assigned to logical array A0 is responsible for such global functions. In the event that the controller responsible for logical array A0 fails, the responsibility for the global functions will be transferred to the controller that remains functional along with responsibility for other logical array A0 functions.

In normal operations, a controller can only write to the user data area 14a, 14b within the logical array to which the controller is assigned. Therefore, each controller 3, 4 has responsibility for rebuilding those areas of the physical storage unit that are part of the logical array to which the controller is assigned.

The controller assigned logical array A0 will be responsible for initiating rebuild operations and formatting a replacement physical storage unit when necessary. The logical structure of the entire array is stored in the reserved area of each logical storage unit. Therefore the reserved area 12 of a replacement storage unit must be rebuilt before determination can be made regarding responsibility for each block within the user area 14. The controllers 3, 4 must communicate with each other to determine whether to continue to the next phase of the rebuild. For example, if a physical storage unit is to be rebuilt, the first controller 3 will rebuild the reserved area 12a associated with the logical array A0 assigned to the first controller 3. In addition, the first controller 3 will request that second controller 4 begin rebuilding a reserved area 12b associated with the logical array A1 assigned to the second controller 4. The first controller 3 must receive a communication from the second controller 4 that the second controller 4 has completed rebuilding its reserved area 12b before the first controller 3 can initiate rebuilding of the user area 14.

Once the reserved areas are rebuilt, the first controller 3 will initiate the rebuilding of the user area 14a associated with the logical array A0 assigned to the first controller 3. Concurrently, the second controller 4 will receive a command from the first controller 3 to begin rebuilding the user area 14b associated with the logical array A1 assigned to the second controller 4. The second controller 4 must communicate to the first controller 3 whether the rebuild of the user area 14b was successfully completed. In the preferred embodiment of the invention, the controllers 3, 4 communicate directly to one another over the channel 5 that couples the controllers 3, 4 to the storage unit being rebuilt. Activating a spare physical storage unit and installing a new physical storage unit into the array will be handled in similar fashion.

Physical storage unit operations (such as formatting, mode selections, and background diagnostics) are initiated by the controller assigned to logical array A0. Communications between the two controllers 3, 4 allows the controller not assigned to logical array A0 to determine both the status of such operations and the status of the associated storage unit as necessary.

In the above discussion, the logical storage units are always uniquely assigned to the logical array and each logical array is uniquely assigned to a controller during normal operations. Functions such as diagnostic tests and spindle synchronization, are uniquely assigned to logical array A0.

Transfer of Control

In the preferred embodiment of the present invention, control of a logical array A0, A1 may be passed from one controller to the other automatically or manually. In automatic mode, one controller may automatically assume control of the other controllers logical array upon a failure of the other controller. When control is assumed automatically, control also is returned automatically (without intervention of the CPU 1) upon repair of the failed controller. In manual mode, control is transferred under command of the CPU 1. Selection of manual or automatic mode is made by the system user.

Figure 6:
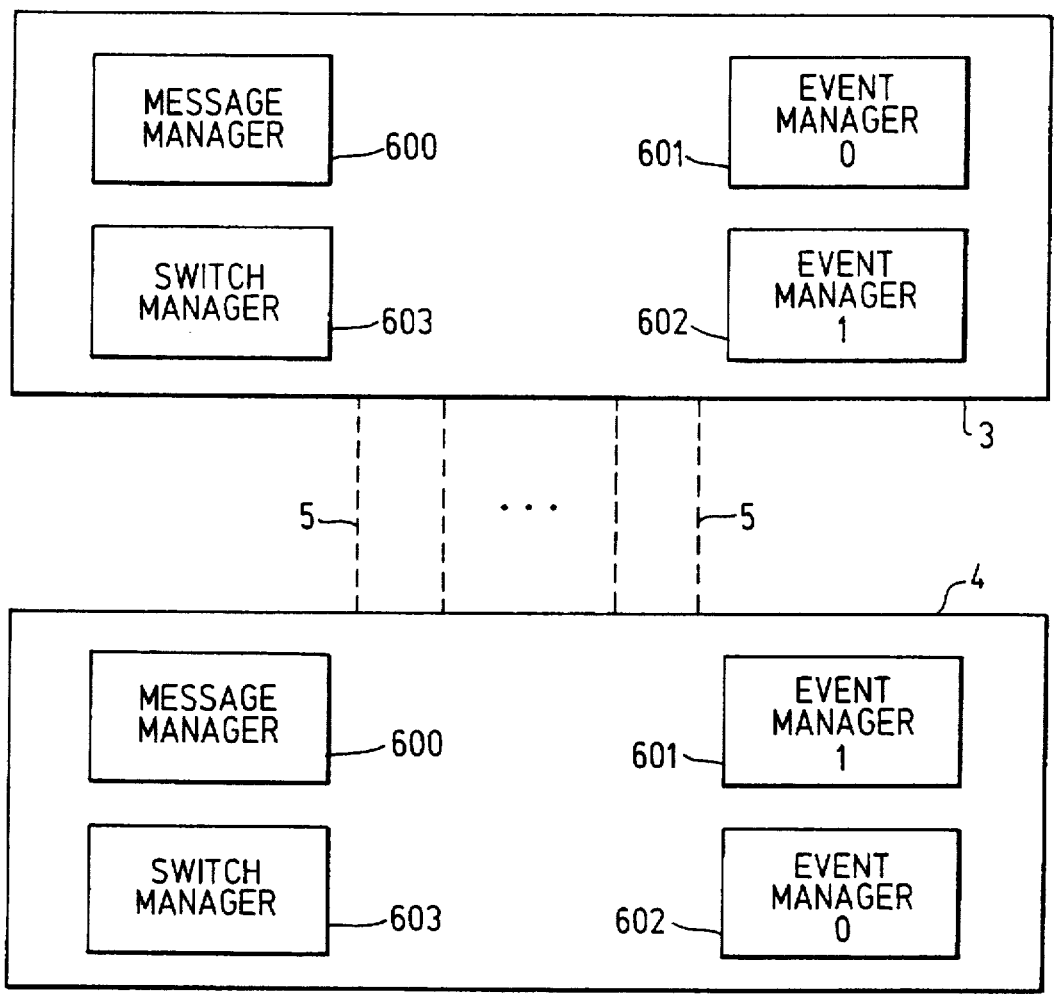
FIG. 6 is a simplified block diagram of array controllers used in the preferred embodiment of the present invention.

FIG. 6 is a simplified block diagram of the controllers 3, 4. The processor in each controller maintains a message management module 600, a primary event management module 601, a secondary event management module 602, and a switch management module 603. Each message management module 600 is responsible for receiving synchronous messages from another controller. Each primary event management module controls the flow of data into and out of the logical array corresponding to that array controller. Each secondary event management module controls the flow of data into and out of the logical array corresponding to the other controller upon a failure of the other controller. Each switch management module is responsible for determining when the secondary event management module will become active in controlling the other logical array.

When both controllers 3, 4 are operational, the primary event management module 601 will be fully active in each of the two controllers 3, 4. The secondary event management module 602 in each controller 3, 4 remains dormant until the switch management module 603 activates it. The switch management module determines when a controller has failed by monitoring messages sent at regular intervals from the other controller. If a message is not received by a controller from the other controller within a specified amount of time, a timer in the switch management module 603 will "time out," thereby indicating the delinquent controller is not operating properly. Each time a message is received, the timer is reset.

In automatic mode, the switch management module 603 activates the secondary event management module 602 whenever the timer expires. In manual mode, a message indicating that the delinquent controller is late is sent from the switch management module 603 to the message management module 600. The message management module transmits the message to the CPU 1. The CPU 1 will subsequently return a command to fully activate the secondary event management module 602.

The secondary event management module 602 in each controller is identical to the primary event management module 601 operating in the other controller. Upon being activated by the switch management module 603, the secondary event management module 602 is directed to the reserved area 12 within an LSU assigned to the failed controller. The reserved area 12a, 12b corresponding to the failed controller contains logical structure information and status that allows the secondary event management module 602 to determine whether any operations were in progress when the failed controller ceased functioning properly. The system configuration is read from the appropriate reserved area 12. The system configuration allows the secondary event management module 602 to determine which LSUs and physical storage units were assigned to the failed controller. The system configuration also provides all the information necessary for the secondary event management module 602 to begin operating at the point that the failed controller ceased operating properly.

Each controller 3, 4 makes entries to an event log in the corresponding reserved area 12a, 12b of each LSU within the logical array assigned to that controller. The event logs provide historical information for later diagnosic operations.

Once the secondary event management controller 602 of the functional controller has accessed the system configuration in the reserved area 12 associated with the logical array that was formerly controlled by the dilinquent controller, the secondary event management module 602 will "time share" the resources of the functional controller with the primary event management module 601. Thus, the primary event management module 601 will continue to control the operation of the logical array (for example A0) assigned to the functional controller, while the secondary event management module 602 will control the operations of the logical array A1 in place of the primary event management module 601 of the failed controller. "Collisions" will not occur because neither event management module 601, 602 can access the LSUs assigned to the other event management module 602, 601.

Initialization of Controllers

Upon initialization, each controller 3, 4 must determine whether the other controller has control over both logical arrays. In the preferred embodiment, this is done by a direct inquiry sent to the controller from the controller being initialized. When power is applied to both controllers 3, 4 concurrently, each will send a "status" message to the other indicating that the sender is operating. The status message is repeated at regular intervals. This prevents the timer in each switch management module 603 in each controller from timing out. Once a controller receives an initial status message from the other controller, the receiving controller sends a query asking the other controller whether the other controller has control of both logical arrays A0, A1. When power is applied to both controllers 3, 4 concurrently the answer will be "no".

After receiving a negative response, the receiving controller will read the logical structure stored in the reserved areas 12 associated with the logical array to which the controller is primarily assigned and begin to exercise control over the logical array to which the controller is assigned. In the preferred embodiment, the controller would determine to which logical array it is assigned by reading a hardware address containing that information.

If a first controller is controlling both logical arrays the second controller must, after being initialized, regain control of the logical array to which the second controller is assigned. This is done by sending a message from the second controller to the first controller indicating the control of the logical array assigned to the second controller should be returned to the second controller. After receiving the message from the second controller, the first controller ceases controlling the logical array not assigned to the first controller, and replies with a message indicating that the second controller should read the system configuration from the reserved area 12 of the logical array assigned to the second controller. Once the configuration is known by the second controller, the second controller assumes control of the logical array to which it was assigned by restarting any operations that may have been in progress (the information that is required to restart any operations previously started was stored in the reserved area of the LSUs by the other controller as the operation was being performed).

It should be clear from the above description that the novel aspects of the invention are the use of a plurality of logical arrays which include a plurality of logical storage units and the use of a plurality of controllers which, under normal conditions, are each dedicated to a single logical array and which are capable upon a failure of any other controller of assuming control of the logical array of which the failed controller had control.

It will be understood that various modifications may be made without departing from the spirit and scope of the invention. For example, multiple CPUs may be used. In such embodiments of the present invention, each CPU may be assigned a controller and logical array. However, this is not necessary so long as provisions are made for multiple processors accessing memory. Further, the preferred embodiment describes two logical arrays. Multiple logical arrays will be understood to be within the spirit and scope of the invention. Also, an embodiment is possible and within the scope of the invention in which a switch module disconnects a failed array controller from each of the channels to prevent disturbances to the channels. Accordingly, it will be understood that the invention is not to be limited by the specific illustrated embodiment, but only by the scope of the appended claims.

We claim:

1. A redundant data storage array system including:
    a. a multiplicity of physical data storage units, each physical data storage unit comprising at least one logical data storage unit;
    b. at least two logical arrays, each comprising at least one logical data storage unit;
    c. at least two redundant array controllers, each corresponding to a logical array, at least one redundant array controller actively coupled to at least one physical data storage unit to which at least one other array controller is actively coupled, and each capable of accessing only the corresponding logical array unless another array controller has failed, whereupon an array controller other than the failed array controller is granted access to the logical array corresponding to the failed array controller; and
    d. means in each redundant array controller for activating a secondary event management means corresponding to a failed controller after the switch management means determines that such a failure has occurred;
wherein each redundant array controller further includes a normally active primary event management means for controlling data flowing into and out of only the logical array corresponding to that array controller, and at least one normally dormant secondary event management means for controlling the flow of data into and out of only a logical array corresponding to another controller only after the failure of such other controller, the at least one secondary event management means becoming active only when the other controller fails, such that the primary event management means and the at least one secondary event management means share the redundant array controller that includes the primary event management means and the at least one secondary event management means;
wherein the primary event management means is capable of accessing only the logical array corresponding to the redundant array controller, and the secondary event management means is capable of accessing only the logical array corresponding to the failed controller; wherein each redundant array controller includes a switch management means for determining that another array controller within the system has failed;
wherein the switch management means receives messages from other array controllers on a periodic basis and includes a resetable timer for determining when the time between receipt of each message has exceeded a specified duration.

2. The redundant data storage array system of claim 1, wherein the logical storage units are grouped into logical redundancy groups which are further grouped into logical volumes, each logical storage unit within a logical volume being associated with the same logical array.

3. The redundant data storage array system of claim 1, wherein the logical storage units further include:
    a. a reserved area; and
    b. a user area.

4. The redundant data storage array system of claim 1, wherein the redundant array controllers are each capable of activating at least one of its at least one secondary event management means absent commands from another controller.

5. The redundant data storage array system of claim 4, wherein each redundant array controller further includes a switch management means for determining that another array controller has failed and wherein a message from the switch management means initiates activation of at least one secondary event management means.

6. The redundant data storage array of claim 5 wherein each of said switch management means comprises a resettable timer for determining when a time between receipt of each message has exceeded a specified duration.

7. The redundant data storage array system of claim 1, wherein each redundant array controller further includes a switch management means for determining that another array controller has failed and wherein a message from the switch management means is sent to a remote command source which, upon receipt of the message, determines whether to activate the secondary event management means and wherein the redundant array controllers are each capable of activating a secondary event management means under commands from the remote command source.

8. A method for transferring control of a logical array from a failed array controller to a functional array controller, including the steps of:
    a. providing a plurality of logical arrays, each associated with one of a plurality of active array controllers, each array controller including a normally active event management means and a plurality of normally dormant event management means each uniquely corresponding to the normally active event management means in one of the other array controllers;
    b. receiving messages by the functional array controller from other array controllers on a periodic basis;
    c. determining when the time between receipt of each message has exceeded a specified duration;
    d. determining that an array controller has failed when the specified duration is exceeded for that controller;
    e. activating the normally dormant event management means corresponding to the active event management means in the failed controller, in the functioning array controller, after determining that an array controller has failed;
    f. sharing the functioning array controller by the activated normally dormant event management means and the normally active event management means of the functioning array controller, wherein at least two array controllers are actively coupled to one data storage means simultaneously;

wherein the primary event management means is capable of accessing only the logical array corresponding to the functional array controller, and the secondary event management means is capable of accessing only the logical array corresponding to the failed controller.

9. The method of claim 8, wherein the determination as to whether an array controller has failed is made by the steps of:

a. receiving messages in a functional array controller sent on regular intervals from each other array controller;

b. monitoring the amount of time between messages received by the functional array controller;

c. identifying any array controller that sends no message to a functional array controller within a specified amount of time, measured from the time the last message was received by the functional array controller, as a failed controller.

10. The method of claim 9, wherein the logical arrays provided include logical data storage units including a reserved area for storing logical structure and status information, further including the steps of:

a. storing logical structure and status information in the reserved area of each of the logical data storage units of the logical array;

b. reading logical structure and status information from the reserved area of one of the logical storage units associated with a failed array controller to determine whether the failed array controller was performing an operation at the time the failure occurred;

c. instructing the event management means in a functioning array controller, the event management means corresponding to the active event management means in the failed array controller, to complete any operation that was begun by the active event management means within the failed array controller.

11. A method for transferring control of a logical array from a failed array controller to a functional array controller, including the steps of:

a. providing a plurality of logical arrays, each associated with one of a plurality of a active array controllers, each array controller including a plurality of normally inactive event management means corresponding to each of the other array controllers and a normally active event management means corresponding to the array controller that includes the normally active event management means;

b. providing an external control source;

c. receiving messages by the functional array controller from other array controllers on a periodic basis;

d. determining when the time between receipt of each message has exceeded a specified duration;

e. determining that an array controller has failed when the specified duration for that array controller is exceeded;

f. sending a message to the external control source indicating that an array controller has failed;

g. receiving commands from the external control source to activate the normally inactive event management means corresponding to the failed array controller in the functioning array controller;

h. sharing the functioning array controller by the activated normally inactive event management means and the normally active event management means of the functioning array controller, wherein at least two active array controllers are coupled to one data storage unit simultaneously;

wherein the normally active event management means is capable of accessing only the logical array corresponding to the functional array controller, and the activated normally inactive event management means is capable of accessing only the logical array corresponding to the failed controller.

12. The method of claim 11, wherein the determination as to whether an array controller has failed is made by the steps of:

a. receiving messages in a functional array controller sent on regular intervals from each other array controller;

b. monitoring the amount of time between messages received by the functional array controller;

c. identifying any array controller that sends no message to a functional array controller within a specified amount of time, measured from the time the last message was received by the functional array controller, as a failed controller.

13. The method of claim 12, wherein the logical arrays provided include logical data storage units including a reserved area for storing logical structure and status information, further including the steps of:

a. storing logical structure and status information in the reserved area of each of the logical data storage units of the logical array;

b. reading logical structure and status information from the reserved area of one of the logical storage units associated with a failed array controller to determine whether the failed array controller was performing an operation at the time the failure occurred;

c. instructing the event management means in a functioning array controller, the event management means corresponding to the active event management means in the failed array controller, to complete any operation that was begun by the active event management means within the failed array controller.

14. A redundant data storage array system for performing data storage functions, including global functions, the data storage array system including:

a. at least two physical data storage units, each physical data storage unit comprising at least one logical data storage unit;

b. at least two logical arrays, each comprising at least one logical data storage unit, the global functions being common to both of the at least two logical arrays;

c. at least two redundant array controllers, each corresponding to a logical array, one of the redundant array controllers being responsible for performing all of the global functions, at least one redundant array controller actively coupled to at least one physical data storage unit to which at least one other array controller is actively coupled, each redundant array controller being capable of accessing only the corresponding logical array unless another array controller is granted access to the logical array corresponding to the failed array controller; and d. means in each redundant array controller for activating a secondary event management means corresponding to a failed controller after the switch management means determines that such a failure has occurred;

wherein each redundant array controller further includes a normally active primary event management means for controlling data flowing into and out of only the logical array corresponding to that array controller, and at least one normally dormant secondary event management means for controlling the flow of data into and out of only a logical array corresponding to another controller only after the failure of such other controller, the at least one secondary event management means becoming active only when the other controller fails, such that the primary event management means and the at least one secondary event management means share the redundant array controller that includes the primary event management means and the at least one secondary event management means;

wherein the primary event management means is capable of accessing only the logical array corresponding to the redundant array controller having the primary event management means, and the secondary event management means is capable of accessing only the logical array corresponding to the failed controller;

wherein each redundant array controller includes a switch management means for determining that another array controller within the system has failed;

wherein the switch management means receives messages from other array controllers on a periodic basis and includes a resetable timer for determining when the time between receipt of each message has exceeded a specified duration.

* * * * *